(12) United States Patent
Kan

(10) Patent No.: US 9,869,853 B2
(45) Date of Patent: Jan. 16, 2018

(54) ILLUMINATION DEVICE FOR MICROSCOPE AND MICROSCOPE

(71) Applicant: OLYMPUS CORPORATION, Tokyo (JP)

(72) Inventor: Kazuhiro Kan, Kunitachi (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/190,328

(22) Filed: Jun. 23, 2016

(65) Prior Publication Data
US 2016/0377851 A1 Dec. 29, 2016

(30) Foreign Application Priority Data

Jun. 25, 2015 (JP) ................................. 2015-127696

(51) Int. Cl.

| G02B 21/06 | (2006.01) |
|---|---|
| G02B 21/24 | (2006.01) |
| G02B 21/00 | (2006.01) |
| G02B 21/08 | (2006.01) |
| G02B 21/26 | (2006.01) |

(52) U.S. Cl.
CPC ....... *G02B 21/248* (2013.01); *G02B 21/0092* (2013.01); *G02B 21/082* (2013.01); *G02B 21/26* (2013.01)

(58) Field of Classification Search
CPC .......................... G02B 21/0092; G02B 21/248
USPC .......................... 359/381, 384, 385, 386, 390
See application file for complete search history.

(56) References Cited

U.S. PATENT DOCUMENTS

| 5,633,752 A * | 5/1997 | Tsuchiya ................ G02B 21/06 359/368 |
| 6,400,501 B2 * | 6/2002 | Tsuchiya .................. G02B 7/16 359/368 |
| 7,957,058 B2 * | 6/2011 | Sugiura ................ G02B 5/3066 359/368 |
| 2012/0050851 A1 * | 3/2012 | Euteneuer .............. G02B 21/02 359/381 |
| 2016/0299057 A1 * | 10/2016 | Casas ................... H04N 1/2191 |

FOREIGN PATENT DOCUMENTS

| JP | 2005-003720 A | 1/2005 |
| JP | 2009-163069 A | 7/2009 |

* cited by examiner

*Primary Examiner* — Thomas K Pham
*Assistant Examiner* — Nicholas R Pasko
(74) *Attorney, Agent, or Firm* — Scully, Scott, Murphy & Presser, P.C.

(57) ABSTRACT

An illumination device for a microscope includes: a lamp house configured to emit illumination light; and a turret having a first mirror unit for polarization observation and a second mirror unit for another observation method, the turret being configured to rotate the first and second mirror units on a plane perpendicular to an optical axis of an observation optical system of the microscope to position one of the first and second mirror units on the optical axis. The first mirror unit includes a polarizer and a mirror. The turret includes an analyzer arranged on an optical axis of the first mirror unit. The turret rotates the analyzer and the first mirror unit on the plane perpendicular to the optical axis of the observation optical system of the microscope while maintaining a positional relation between the analyzer and the first mirror unit.

4 Claims, 10 Drawing Sheets

ILLUMINATION DEVICE FOR MICROSCOPE AND MICROSCOPE

CROSS REFERENCES TO RELATED APPLICATIONS

This application is based upon and claims the benefit of priority from Japanese Patent Application No. 2015-127696, filed on Jun. 25, 2015, the entire contents of which are incorporated herein by reference.

BACKGROUND

1. Technical Field

The disclosure relates to an illumination device for a microscope, the illumination device being configured to generate illumination light for irradiating an observation target in the microscope, and relates to the microscope.

2. Related Art

Conventionally, a technique for switching between a plurality of observation methods with a single microscope has been proposed. Examples of such a technique include a polarization microscope capable of selecting between conoscope observation by transmitted-light illumination and simple polarization observation by epi-illumination (for example, refer to Japanese Laid-open Patent Publication No. 2005-3720) and a microscope capable of switching between a relief contrast microscopy, a differential interference contrast microscopy, and a polarized light microscopy (for example, refer to Japanese Laid-open Patent Publication No. 2009-163069).

SUMMARY

In some embodiments, an illumination device for a microscope includes: a lamp house configured to emit illumination light; and a turret having at least a first mirror unit for polarization observation and a second mirror unit for observation other than the polarization observation, the turret being configured to rotate the first and second mirror units on a plane perpendicular to an observation optical axis of an observation optical system of the microscope to position one of the first and second mirror units on the observation optical axis. The first mirror unit includes: a polarizer configured to pass a one-direction polarization component of the illumination light emitted from the lamp house; and a mirror configured to reflect light passed through the polarizer and to irradiate a specimen with the light. The turret includes an analyzer that is arranged on an observation optical axis of the first mirror unit and that is configured to pass a one-direction polarization component of the light reflected from the specimen and entered via an objective lens of the microscope. The turret is configured to rotate the analyzer and the first mirror unit on the plane perpendicular to the observation optical axis of the observation optical system of the microscope while maintaining a positional relation between the analyzer and the first mirror unit.

In some embodiments, a microscope includes the above-described illumination device.

The above and other features, advantages and technical and industrial significance of this invention will be better understood by reading the following detailed description of presently preferred embodiments of the invention, when considered in connection with the accompanying drawings.

DETAILED DESCRIPTION

Figure 1:
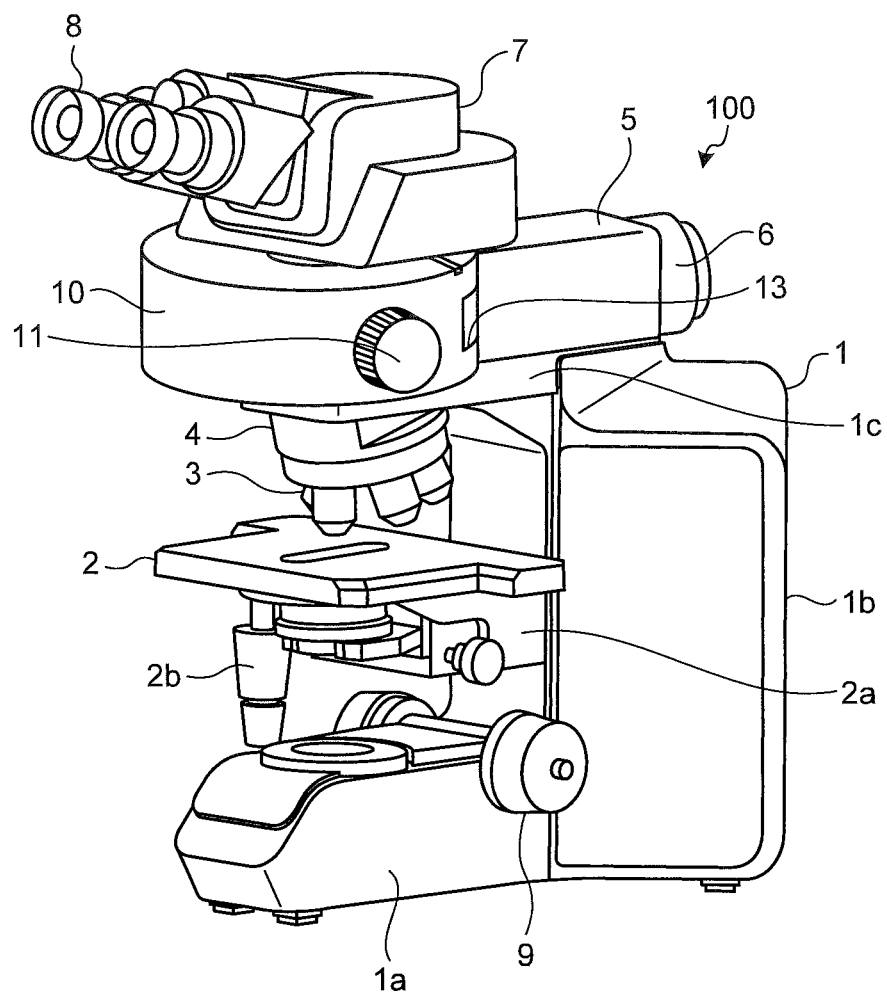
FIG. 1 is a perspective view of an outline structure of a microscope according to an embodiment.

Exemplary embodiments of an illumination device will be described in detail below with reference to the drawings. The present invention is not limited to the embodiments and can be variously changed without departing from the scope of the present invention. The same reference numerals are used to designate the same elements throughout the drawings.

Embodiments

Figure 2:
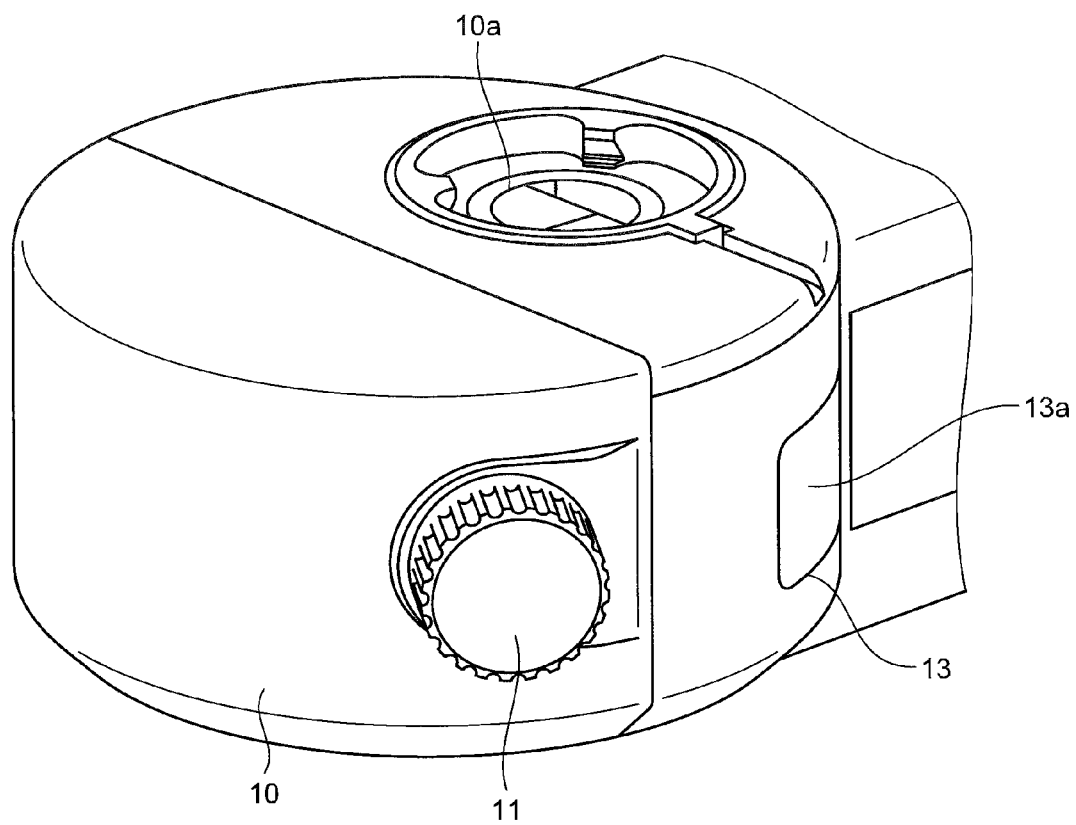
FIG. 2 is a perspective view of a turret arranged at a distal end of an illumination tube used for the microscope in FIG. 1.

FIG. 1 is a perspective view of an outline structure of a microscope according to an embodiment of the present invention. FIG. 2 is a perspective view of a turret arranged at a distal end of an illumination tube used for the microscope in FIG. 1.

A microscope 100 includes: a microscope body 1; a stage 2 on which a specimen is configured to be placed, a revolver 4 which holds a plurality of objective lens 3 and electrically positions the selected objective lens 3 on an observation optical axis; an illumination tube 5, a lamp house 6, and a turret 10 which constitute an epi-illumination device; and a lens barrel 7 placed on an upper portion of the illumination tube 5. The lens barrel 7 is provided with an eyepiece 8 for visually observing an image of the specimen.

The microscope body 1 includes a base portion 1a, a column portion 1b which is erected on a rear side of the base portion 1a, and an arm portion 1c which is supported by the column portion 1b and extends toward the front side. The base portion 1a is a portion directly placed on a place where the microscope 100 is placed such as a desktop. The column portion 1b is erected on the rear side (back side) of the base portion 1a and holds the stage 2 via a stage holding unit 2a. A lower end of the column portion 1b is integrated with the base portion 1a. The arm portion 1c extends from the upper end of the column portion 1b to the front side of the microscope 100. The revolver 4 is attached on a lower side of the arm portion 1c, and the illumination tube 5 is mounted on an upper side of the arm portion 1c. Here, the front side of the microscope 100 means a side where an observer is positioned, and the rear side means a side opposed to the front side.

The microscope 100 includes a focusing handle 9 which vertically moves the stage 2 on which the specimen is placed. The stage 2 is vertically moved by rotating the focusing handle 9 clockwise or counterclockwise, and the specimen is observed. The stage 2 includes a handle 2b at the end thereof. The stage 2 moves the specimen on a plane orthogonal to an optical axis of the objective lens 3 according to a rotating operation of the handle 2b and changes an observing position of the specimen relative to the objective lens 3.

The revolver 4 is rotatably held relative to the arm portion 1c and arranges the objective lens 3 above the specimen. The objective lens 3 is attached to the revolver 4 in an exchangeable manner together with other objective lens having different magnification (observation magnification). The objective lens 3 which is inserted onto an optical path of observation light according to the rotation of the revolver 4 and is used to observe the specimen can be alternatively switched.

The lamp house 6 has an epi-illumination light source for emitting the epi-illumination light. The illumination tube 5 includes a collector lens, an aperture diaphragm, and a field stop arranged at appropriate positions along the optical path of the epi-illumination light. The collector lens (not illustrated) collects the epi-illumination light emitted from the lamp house 6. The turret 10 is arranged on the front side in the illumination tube 5. The turret 10 switches between the plurality of mirror units held by the turret 10 by rotating the mirror units around a rotation axis a on a plane perpendicular to an observation optical axis of an observation optical system of the microscope 100. An illumination device for a microscope according to the embodiment includes the illumination tube 5, the lamp house 6, and the turret 10.

A rotary handle 11 is provided outside the turret 10. The mirror unit necessary for the observation is arranged on the optical axis of the illumination light emitted from the lamp house 6 and on the observation optical axis of the objective lens 3 according to a rotating operation of the rotary handle 11. A casing is provided outside the turret 10. The casing includes an exposure hole 13 which exposes a polarizing plate rotating operation unit for rotating a polarizing plate for polarization observation to be described below. The exposure hole 13 is covered with a lid 13a, and the exposure hole 13 is exposed by removing the lid 13a at the time of the polarization observation. Through-holes 10a are formed above and below the position corresponding to the optical axis of the objective lens 3 in the casing outside the turret 10.

A beam splitter which switches the optical path of the observation light and guides it to the eyepiece 8 is provided in the lens barrel 7. The image of the specimen is introduced into the eyepiece 8 by the beam splitter and is visually observed by the observer via the eyepiece 8.

Figure 3:
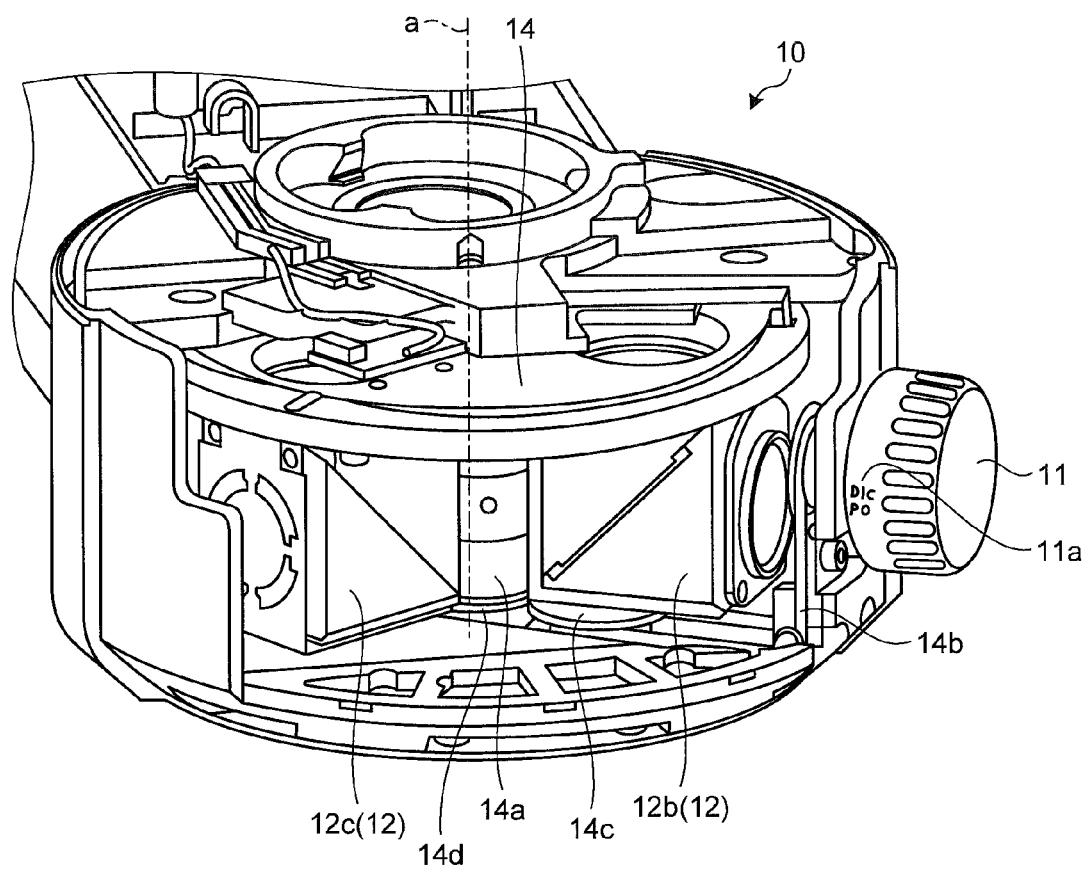
FIG. 3 is a perspective view of the turret when a part of a casing outside the turret is removed.
Figure 4:
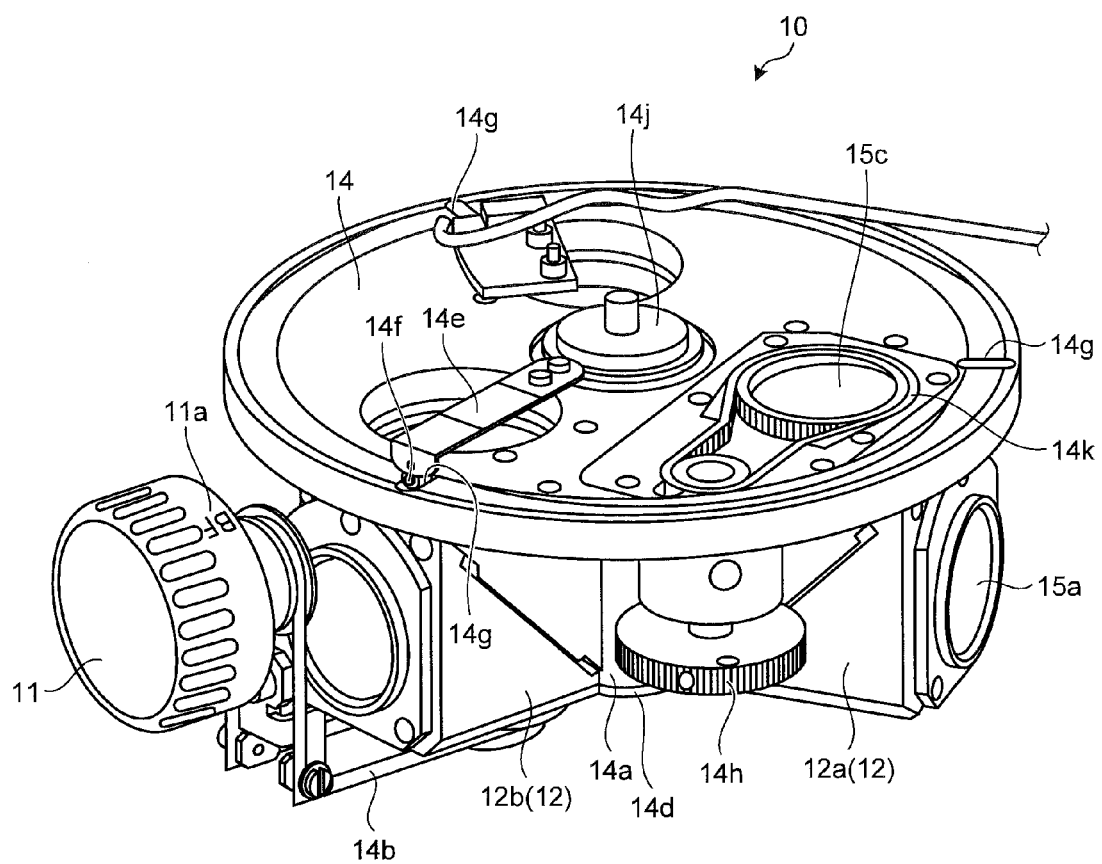
FIG. 4 is a perspective view of the turret from other direction.
Figure 5:
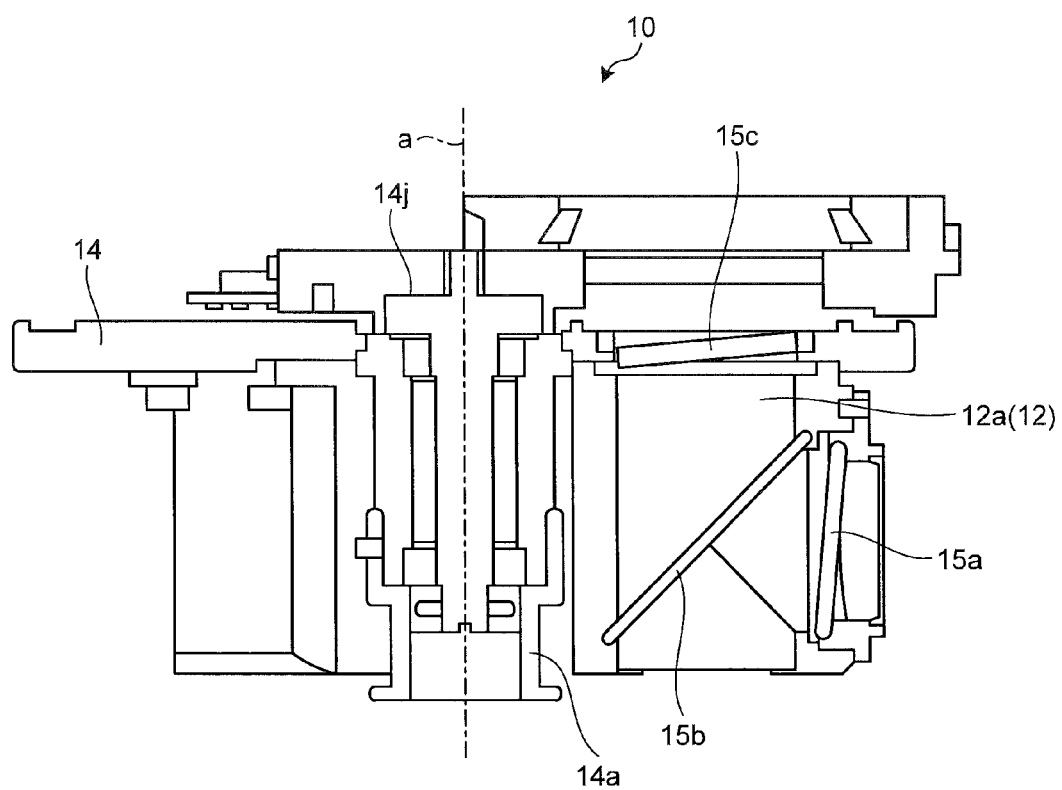
FIG. 5 is a cross-sectional view of the turret.
Figure 6:
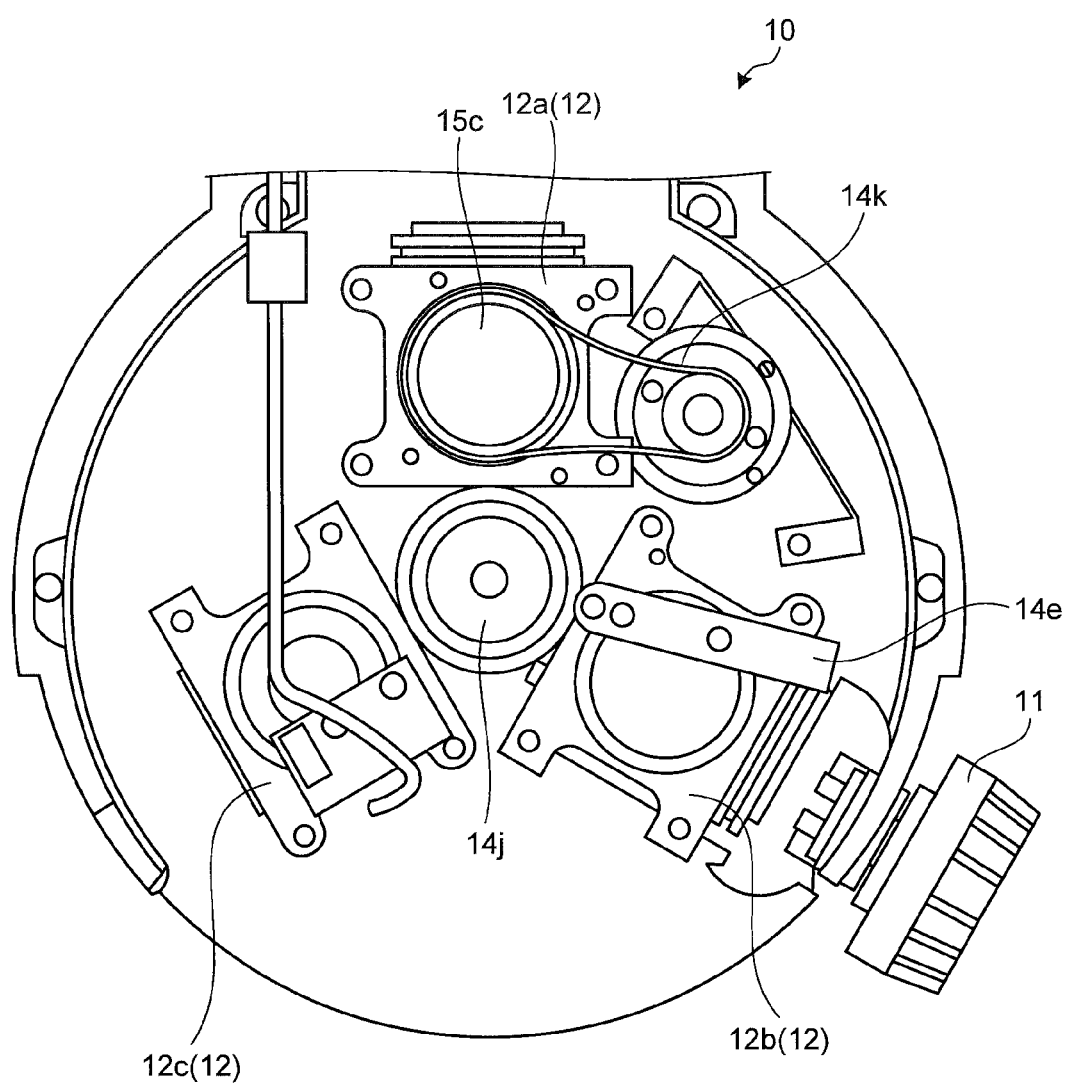
FIG. 6 is a top view of the turret.
Figure 7:
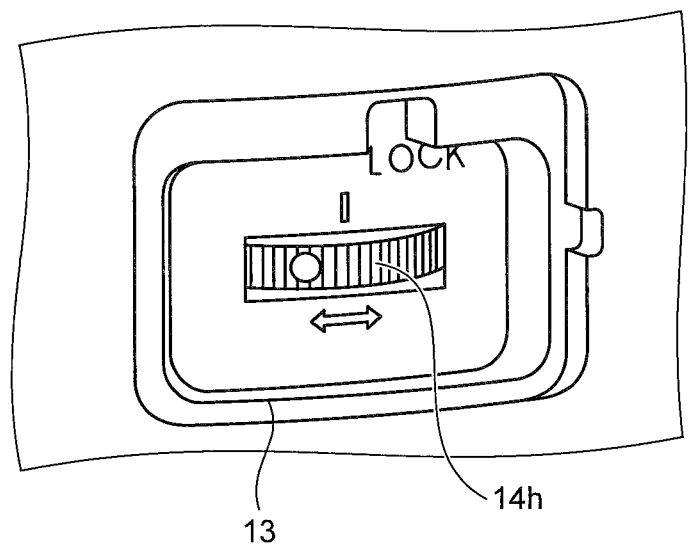
FIG. 7 is a perspective view of an exposure hole formed on an outer peripheral surface of the turret in FIG. 2 and a polarizing plate rotating operation unit exposed from the exposure hole.

Next, the turret 10 of the illumination device for the microscope according to the embodiment will be described with reference to the drawings. FIG. 3 is a perspective view of the turret 10 when a part of the casing outside the turret 10 is removed. FIG. 4 is a perspective view of the turret 10 from other direction. FIG. 5 is a cross-sectional view of the turret 10. FIG. 6 is a top view of the turret 10. FIG. 7 is a perspective view of the exposure hole 13 formed on an outer peripheral surface of the turret 10 in FIG. 2 and the polarizing plate rotating operation unit exposed from the exposure hole 13.

A disk-shaped turret body 14 for holding a mirror unit 12 can be rotated by a rotation shaft 14a and is supported by a turret supporting unit 14j. When the rotary handle 11 is rotated, rotational force is transmitted to gears 14c and 14d via a belt 14b, and then, the rotation shaft 14a and the turret body 14 are rotated. A base end of an elastic member 14e which extends in an outer periphery direction along the upper surface of the turret body 14 is fixed around the turret supporting unit 14j, and a rotation member 14f is provided at another end of the elastic member 14e. In the elastic member 14e, the rotation member 14f is pressed against the upper surface of the turret body 14 with a spring force and the rotation member 14f is fallen in recessed parts 14g respectively provided around the mirror units 12 so that the position of the turret 10 in a rotation direction is fixed. The elastic member 14e, the rotation member 14f, and the recessed part 14g form a click mechanism.

The turret body 14 holds a mirror unit 12a for polarization observation, a mirror unit 12b for bright-field observation, and a mirror unit 12c for dark-field observation. Outer shapes of the mirror units 12a to 12c are formed in the same shape, and the mirror units 12a to 12c are removably held at predetermined positions of the turret body 14. The turret body 14 arranges each mirror units 12a to 12c at the predetermined position, that is, on the optical axis of the illumination light and on the observation optical axis of the objective lens 3 by the rotating operation of the rotary handle 11. The mirror unit 12 held by the turret body 14 is not limited to this.

When at least the mirror unit 12a for polarization observation and a mirror unit for observation by using another observation method are included, a mirror unit for an observation method other than the above, for example, for differential interference observation and fluorescent observation may be held. It is preferable that the number of mirror units 12 be two or more. An index for displaying the mirror unit currently positioned on the optical axis is provided on the side surface of the rotary handle 11, and it is preferable that the observer rotate the rotary handle 11 so that the mirror unit of a desired observation method is arranged on the observation optical axis while confirming the index.

As illustrated in FIG. 5, the mirror unit 12a for polarization observation includes a polarizer 15a and a mirror 15b. The polarizer 15a passes a one-direction polarization component of the illumination light emitted from the lamp house 6, and the mirror 15b reflects the light passed through the polarizer 15a and irradiates the specimen with the light. The mirror unit 12a for polarization observation is provided below an analyzer 15c which passes a one-direction polarization component of the light which is reflected from the specimen rotatably provided on the upper surface of the turret body 14 and is entered via the objective lens 3. As illustrated in FIG. 4, a polarizing plate rotating operation unit 14h is integrally mounted with the turret body 14 near the mirror unit 12a for polarization observation of the turret body 14. When the mirror unit 12a for polarization observation and the analyzer 15c are positioned on the observation optical axis by the rotating operation of the rotary handle 11, the polarizing plate rotating operation unit 14h is formed to be exposed from the exposure hole 13. The rotary handle 11 rotates the analyzer 15c and the mirror unit 12a for polarization observation on a plane perpendicular to the observation optical axis of the observation optical system of the microscope 100 while maintaining a positional relation between the analyzer 15c and the mirror unit 12a for polarization observation. The analyzer 15c which is rotatably placed on the upper surface of the turret body 14 can be rotated via a belt 14k by rotating the polarizing plate rotating operation unit 14h exposed from the exposure hole 13. The analyzer 15c is rotated by the polarizing plate rotating operation unit 14h so that the polarizer 15a and the analyzer 15c are in a crossed-nicol state where polarization directions of the polarizer 15a and the analyzer 15c are perpendicular to each other. However, it is preferable that the polarizing plate rotating operation unit 14h make the crossed-nicol state where the polarization directions are perpendicular to each other by rotating one of the polarizing plates, and the polarizing plate rotating operation unit 14h may rotate the polarizer 15a.

In the embodiment, when the other observation method is switched to the polarization observation, the mirror unit 12a for polarization observation can be positioned on the observation optical axis by the rotating operation of the rotary handle 11 without inserting a slider. An index 11a is formed on the rotary handle 11, and it is not necessary to insert the slider. Therefore, a beginner can easily switch between the observation methods. Regarding the rotation operation of the analyzer 15c which is the polarizing plate, only when the mirror unit 12a for polarization observation is positioned on the observation optical axis, the polarizing plate rotating operation unit 14h is exposed from the exposure hole 13, and the analyzer 15c can be rotated. Therefore, the polarization observation can be performed without an erroneous operation.

In the embodiment, the exposure hole 13 is covered with the removable lid 13a. By arranging a shutter instead of the lid 13a, only when the mirror unit 12a for polarization observation is positioned on the observation optical axis, the polarizing plate rotating operation unit 14h may be operated by opening the shutter and exposing the exposure hole 13. Alternatively, if a wall portion is provided on a region of an outer periphery of the turret body 14 other than the mirror units 12a to 12c and the polarizing plate rotating operation unit 14h and when the other mirror unit 12 is positioned on the observation optical axis, the exposure hole 13 may be covered with the wall during the rotating operation. Only when the mirror unit 12a for polarization observation is positioned on the observation optical axis, the polarizing plate rotating operation unit 14h may be exposed from the exposure hole 13.

Figure 8:
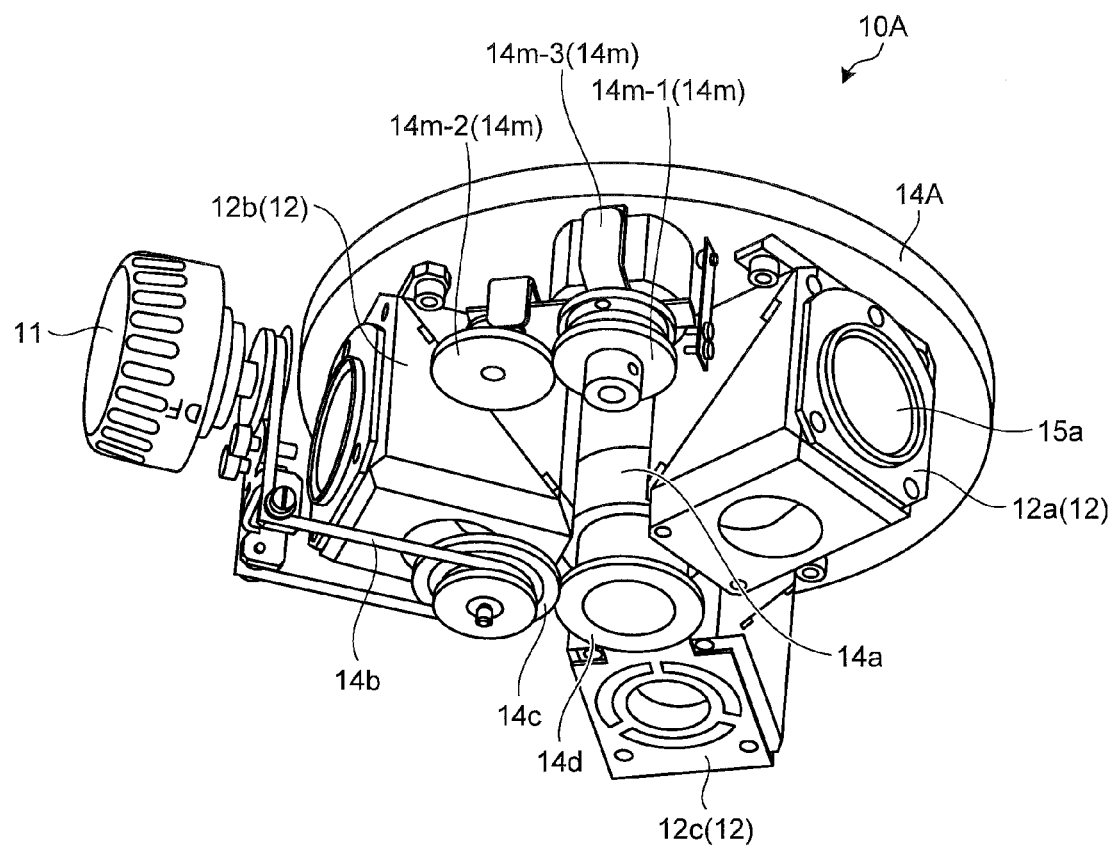
FIG. 8 is a perspective view to describe a polarizing plate rotating operation unit of a turret according to a first modification of the embodiment.
Figure 9:
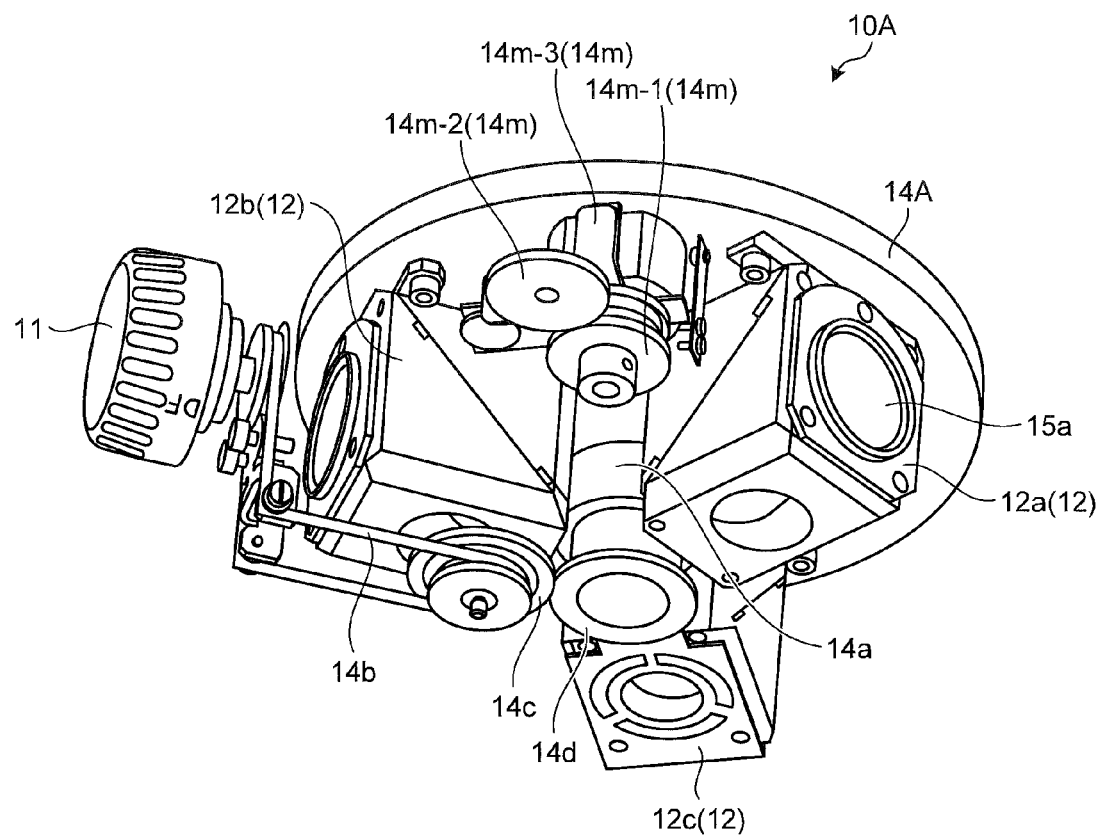
FIG. 9 is a perspective view to describe the polarizing plate rotating operation unit of the turret according to the first modification of the embodiment.

The polarizing plate rotating operation unit may include a polarizing plate rotating unit, a rotation operating unit, and a positioning unit. FIGS. 8 and 9 are perspective views to describe a polarizing plate rotating operation unit of a turret according to a first modification of the embodiment.

In a turret 10A, a polarizing plate rotating operation unit 14m is integrally mounted with a turret body 14A near a mirror unit 12a for polarization observation of the turret body 14A. The polarizing plate rotating operation unit 14m includes a polarizing plate rotating unit 14m-1, a rotation operating unit 14m-2, and a positioning unit 14m-3. The polarizing plate rotating unit 14m-1 winds a belt for rotating an analyzer 15c around an end and includes a gear at the other end. A part of the rotation operating unit 14m-2 can be pulled out so as to be exposed outside the turret 10A when the mirror unit 12a for polarization observation is positioned on an observation optical axis by a rotating operation of a rotary handle 11. The positioning unit 14m-3 restricts the rotation of the polarizing plate rotating unit 14m-1. The rotation of the polarizing plate rotating unit 14m-1 is normally restricted by the positioning unit 14m-3. After the rotation operating unit 14m-2 has been pulled out from the turret 10A and the restriction of the positioning unit 14m-3 has been released, the analyzer 15c is rotated according to the rotating operation of the rotation operating unit 14m-2. After the rotating operation of the analyzer 15c by the rotation operating unit 14m-2 has ended, the rotation of the analyzer 15c is adjusted by restricting the rotation of the polarizing plate rotating unit 14m-1 by the positioning unit 14m-3 and pushing back the rotation operating unit 14m-2 in the turret 10A.

In the first modification, as illustrated in FIG. 8, the rotation operating unit 14m-2 is normally arranged in the turret 10A. However, when the mirror unit 12a for polarization observation is positioned on the observation optical axis, as illustrated in FIG. 9, a part of the rotation operating unit 14m-2 can be pulled out from the turret 10A. Therefore, the observer can perform the rotation operation of the analyzer 15c without putting a hand within the turret 10A.

Figure 10:
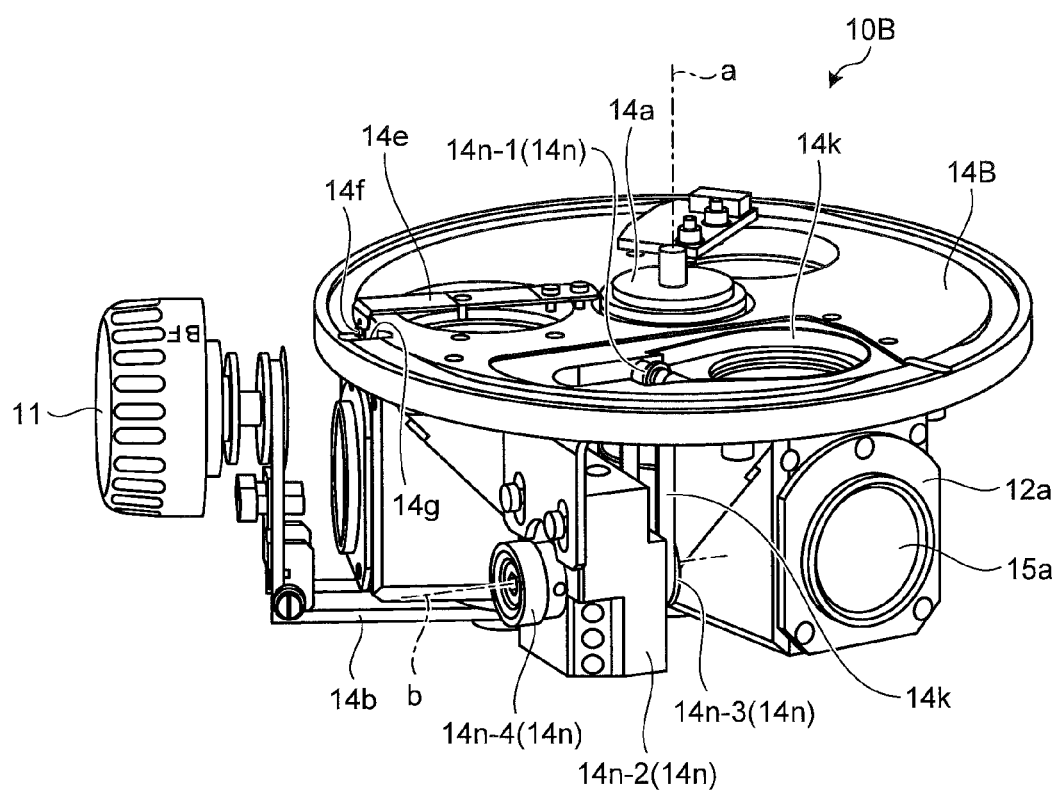
FIG. 10 is a perspective view to describe a polarizing plate rotating operation unit of a turret according to a second modification of the embodiment.

The polarizing plate rotating operation unit may be a mechanism rotated by a tool. FIG. 10 is a perspective view to describe a polarizing plate rotating operation unit of a turret according to a second modification of the embodiment.

In a turret 10B, a polarizing plate rotating operation unit 14n is integrally mounted near a mirror unit 12a for polarization observation of a turret body 14B. The polarizing plate rotating operation unit 14n includes a pulley 14n-1 which bends a belt 14k for rotating an analyzer 15c at a right angle and a rotation operating unit 14n-2. The rotation operating unit 14n-2 has a rotation axis b perpendicular to a rotation axis a of the turret 10B. A pulley 14n-3 which winds the belt 14k is arranged at one end of the rotation axis, and a fitting hole 14n-4 in which a tool is fitted is formed at the other end. When the mirror unit 12a for polarization observation is positioned on the observation optical axis by a rotating operation of a rotary handle 11, the fitting hole 14n-4 is exposed from an exposure hole of a casing. By fitting a tool into the fitting hole 14n-4 and rotating it, an analyzer 15c can be rotated via the pulleys 14n-3 and 14n-1, and the belt 14k.

In the second modification, an observer can more safely rotate the analyzer 15c without putting a hand within the turret 10B.

As described above, the illumination device for the microscope according to some embodiments is useful for the microscope which can switch between a plurality of observation methods including the polarization observation.

The illumination device and the microscope according to some embodiments can arrange an optical element necessary for the polarization observation on the illumination light axis or on the observation optical axis by a single operation and have excellent operability. In addition, the illumination device and the microscope can prevent an erroneous operation at the time of switching between the observation methods.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An illumination device for a microscope, the illumination device comprising:
   a lamp house configured to emit illumination light;
   a turret having at least a first mirror unit for polarization observation and a second mirror unit for observation other than the polarization observation, the turret being configured to rotate the first and second mirror units on a plane perpendicular to an observation optical axis of an observation optical system of the microscope to position one of the first and second mirror units on the observation optical axis, and a casing that houses the turret; wherein
the first mirror unit includes:
- a polarizer configured to pass a one-direction polarization component of the illumination light emitted from the lamp house; and
- a mirror configured to reflect light passed through the polarizer and to irradiate a specimen with the light, the turret includes an analyzer that is arranged on an observation optical axis of the first mirror unit, the analyzer being configured to pass a one-direction polarization component of the light reflected from the specimen and entered via an objective lens of the microscope, the turret is configured to rotate the analyzer relative to the first mirror unit on the plane perpendicular to the observation optical axis of the observation optical system of the microscope while maintaining a positional relation between the analyzer and the first mirror unit;

the turret includes a polarizing plate rotating unit configured to rotate the analyzer;

the casing has an exposure hole through which the polarizing plate rotating unit is operable to rotate the analyzer when the first mirror unit and the analyzer are positioned on the observation optical axis by the turret, the polarizing plate rotating unit not being operable through the exposure hole when the second mirror unit is positioned on the observation optical axis by the turret; and the turret includes:
- a disk-shaped turret body for holding the first and second mirror units, the analyzer being rotatably supported in the disk-shaped turret body at a position above the first mirror unit in a direction away from the objective lens;
- a rotation shaft configured to rotate the first and second mirror units together with the turret body;
- a turret supporting unit for supporting the turret body; and
- a wall portion that is provided on an outer periphery of the turret body, and has a hole through which the polarizing plate rotating unit is exposed outside the casing via the exposure hole.

2. The illumination device according to claim 1, wherein the polarizing plate rotating unit is formed integrally with the turret body.

3. The illumination device according to claim 1, wherein the casing includes a shutter for closing the exposure hole, the shutter being opened only when the first mirror unit is positioned on the observation optical axis.

4. A microscope comprising the illumination device according to claim 1.

* * * * *